(12) United States Patent
Joye et al.

(10) Patent No.: US 9,356,783 B2
(45) Date of Patent: May 31, 2016

(54) METHOD FOR CIPHERING AND DECIPHERING, CORRESPONDING ELECTRONIC DEVICE AND COMPUTER PROGRAM PRODUCT

(71) Applicant: THOMSON LICENSING, Issy de Moulineaux (FR)

(72) Inventors: Marc Joye, Palo Alto, CA (US); Benoit Libert, Lyons (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/476,057

(22) Filed: Sep. 3, 2014

(65) Prior Publication Data
US 2015/0063564 A1    Mar. 5, 2015

(30) Foreign Application Priority Data
Sep. 5, 2013   (EP) ..................................... 13306218

(51) Int. Cl.
*H04L 9/14*   (2006.01)
*H04L 9/30*   (2006.01)
*H04L 9/08*   (2006.01)

(52) U.S. Cl.
CPC ............... *H04L 9/14* (2013.01); *H04L 9/0847* (2013.01); *H04L 9/3006* (2013.01); *H04L 2209/24* (2013.01)

(58) Field of Classification Search
CPC .......................... H04L 9/3006; H04L 2209/24

USPC ........................ 380/3, 285, 259; 713/183, 188
See application file for complete search history.

(56) References Cited

U.S. PATENT DOCUMENTS

| | | | | |
|---|---|---|---|---|
| 7,327,846 | B1* | 2/2008 | Chang | H04L 9/0841 380/259 |
| 2006/0139494 | A1* | 6/2006 | Zhou | H04N 5/144 348/607 |
| 2008/0298582 | A1* | 12/2008 | Sakai | H04L 9/0822 380/44 |

(Continued)

OTHER PUBLICATIONS

"An Overview of Public Key Cryptography"—Martin E. Hellman, Stanford Univ., Jun. 2006 http://www-ee.stanford.edu/~hellman/publications/31.pdf.*

(Continued)

*Primary Examiner* — Randy Scott
(74) *Attorney, Agent, or Firm* — Myers Wolin LLC

(57) ABSTRACT

In one embodiment, it is proposed a method for ciphering a plaintext M belonging to a group $\mathbb{G}$ of prime order p, such method being performed by an electronic device. The method is remarkable in that it comprises:
  encrypting said plaintext M in function of a public vector $Z=(Z_1, \ldots, Z_l) \in \mathbb{G}^l$ of l elements of said group $\mathbb{G}$, where $l \geq 2 \log_2(p)$, and a one-time private vector K comprising l binary elements $(K[1], \ldots, K[l]) \in \{0,1\}^l$, said encrypting delivering a first ciphertext belonging to a group $\mathbb{G}^{k_1}$ for an integer $k_1 \geq 1$;
  encrypting said l binary elements delivering a second ciphertext in a group $\mathbb{G}^{k_2}$, for an integer $k_2 > 1$.

17 Claims, 3 Drawing Sheets

(56) References Cited

U.S. PATENT DOCUMENTS

2012/0294442 A1 11/2012 Camenisch et al.
2013/0058479 A1* 3/2013 Tang ................. H04L 9/0836
380/46

OTHER PUBLICATIONS

Katz et al:"Predicate Encryption Supporting Disjunctions, Polynomial Equations, and inner Products"; Apr. 13, 2008 Advances in Cryptology A Eurocrypt 2008; pp. 146-162.
Libert et al:"Linearly Homomorphic Structure-Preserving Signatures and their Applications" Aug. 18, 2013; The Semantic Web—ISWC 2004; pp. 289-307.
Libert et al:"Scalable Group Signatures with Revocation" Apr. 15, 2012 Advances in Cryptology Eurocrypt 2012, pp. 609-627.
Okamoto et al: "Hierarchical Predicate Encryption for Inner-Products", Dec. 6, 2009, Advances in Cryptology A Asia Crypt 2009; pp. 214-231.
Abe et al., "Optimal Structure-Preserving Signatures in Asymmetric Bilinear Groups", Advances in Cryptology, Crypto 2011, LNCS vol. 6841, 2011, pp. 649-666.
Abe et al., "Structure-Preserving Signatures and Commitments to Group Elements", Advances in Cryptology, Crypto 2010, LNCS 6223, 2010, pp. 209-236.
Camenisch et al., "Structure Preserving CCA Secure Encryption and Applications", Proceedings of AsiaCrypt 2011, LNCS 7073, 2011, pp. 89-106.
Groth et al., "Efficient Non-interactive Proof Systems for Bilinear Groups", Proceedings of Eurocrypt 2008, LNCS 4965, 2008, pp. 415-432.
Heng et al., "A k-Resilient Identity-Based Identification Scheme in the Standard Model", International Journal of Cryptology Research, vol. 2, No. 1, 2010, pp. 15-25.
Waters, B., "Efficient Identity-Based Encryption Without Random Oracles", Proceedings of Eurocrypt 2005, LNCS 3494, 2005, pp. 114-127.
Sakai et al., "Group Signatures with Message-Dependent Opening", Proceedings of the 5th International Conference on Pairing-Based Cryptography (Pairing 2012), LNCS 7708, 2013, pp. 270-294.
Abe et al., "Constant-Size Structure-Preserving Signatures: Generic Constructions and Simple Assumptions", Cryptology ePrint Archive, Report 2012/285, 2012, pp. 1-32.
Chase et al., "A Domain Transformation for Structure-Preserving Signatures on Group Elements", Cryptology ePrint Archive, Report 2011/342, pp. 1-28.
Haralambiev, K., "Efficient Cryptographic Primitives for Non-Interactive Zero-Knowledge Proofs and Applications", PhD Thesis in Computer Science, New-York University, May 2011, pp. 1-157.
Abe et al., "Signing on elements in bilinear groups for modular protocol design", Cryptology ePrint Archive: Report 2010/133, 2010, pp. 1-43.
Bellare et al., "Key-privacy in public-key Encryption", Proceedings of Asiacrypt 2001, LNCS 2248, 2001, pp. 568-584.
Bellare et al., "Random oracles are practical: A paradigm for designing effcient protocols", 1st ACM Conference on Computer and Communications Security, Nov. 1993, pp. 1-20.
Benjumea et al., "Fair traceable multi-group signatures", Financial Cryptography 2008, LNCS 5143, 2008, pp. 1-30.
Boneh et al., "Short group signatures", Advances in Cryptology, Crypto 2004, LNCS 3152, 2004, pp. 1-19.
Boneh et al., "Identity-based encryption from the Weil pairing", SIAM Journal of Computing, vol. 32, No. 3, 2003, pp. 586-615.
Camenisch etal., "A signature scheme with effcient protocols", Security in Communications Network 2002, LNCS 2576, 2003, pp. 1-21.
Cathalo et al., "Group encryption: Non-interactive realization in the standard model", Proceedings of AsiaCrypt 2009, LNCS 5912, 2009, pp. 1-18.
Chaum et al., "Group signatures", Advances in Cryptology, Eurocrypt 1991, LNCS 547, 1991, pp. 257-265.
Cramer et al., "A practical public key cryptosystem provably secure against adaptive chosen ciphertext attack", Advances in Cryptology, Crypto 1998, LNCS 1462, May 1998, pp. 1-18.
El Aimani et al., "Toward practical group encryption", ACNS 2013, LNCS 7954, 2013, pp. 1-33.
Groth, J., "Simulation-sound NIZK proofs for a practical language and constant size group signatures", Proceedings of Asiacrypt 2006, LNCS 4284, 2006, pp. 1-46.
Groth, J., "Fully anonymous group signatures without random oracles", Proceedings of Asiacrypt 2007, LNCS 4833, Sep. 7, 2007, pp. 1-21.
Izabachene et al., "Mediated traceable anonymous encryption", Proceedings of Latincrypt 2008, LNCS 6212, 2008, pp. 1-20.
Kiayias et al., "Traceable signatures", Eurocrypt 2004, LNCS 3027, Springer, Jan. 12, 2004, pp. 1-35.
Kiayias et al., "Group encryption", Proceedings of Asiacrypt 2007, LNCS 4833, Jan. 19, 2007, pp. 1-36.
Kiltz, E., "Chosen-ciphertext security from tag-based encryption", Theory of Cryptography Conference 2006, LNCS 3876, Mar. 5, 2006, pp. 1-20.
Libert et al., "Non-interactive CCA-secure threshold cryptosystems with adaptive security: new framework and constructions", Theory of Cryptography Conference 2012, LNCS 7194, Mar. 19, 2012, pp. 1-24.
Paillier, P., "Public-key cryptosystems based on composite degree residuosity classes", Eurocrypt 1999, LNCS 1592, 1999, pp. 223-238.
Trolin et al., "Hierarchical group signatures", 32nd International Colloquium on Automata, Languages and Programming 2005, LNCS 3580, Jul. 11, 2005, pp. 1-70.
Malkin et al., "Signatures resilient to continual leakage on memory and computation", Theory of Cryptography Conference 2011, LNCS 6597, Mar. 28, 2011, pp. 1-30.
Fiat et al., "How to prove yourself: Practical solutions to identification and signature problems", Advances in Cryptology—Crypto 1986, LNCS 263, 1986, pp. 186-194.
Krawczyk et al., "Cameleon signatures", 2000 Network and Distributed System Security Symposium, San Diego, California, USA, Feb. 2, 2000, pp. 1-12.
Qin et al., "Publicly verifable privacy-preserving group decryption", 4th International Conference on Information Security and Cryptology, Inscrypt 2008, LNCS 5487, Dec. 14, 2008, pp. 72-83.
Libert et AL: "Traceable Group Encryption"Published in H. Krawczyk, Ed., Public Key Cryptography—PKC 2014, vol. 8383 of Lecture Notesin Computer Science, pp. 592-610, Springer, 2014.

* cited by examiner

METHOD FOR CIPHERING AND DECIPHERING, CORRESPONDING ELECTRONIC DEVICE AND COMPUTER PROGRAM PRODUCT

This application claims the benefit, under 35 U.S.C. §119 of European Patent Application No. 13306218.2, filed Sep. 5, 2013.

FIELD OF THE DISCLOSURE

The disclosure relates to cryptography, and more particularly to pairing-based cryptography schemes such as identity based encryption schemes.

BACKGROUND OF THE DISCLOSURE

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Structure preserving techniques in cryptography, which aim at constructing primitives where plaintexts, ciphertexts and signatures that are compatible with the Groth-Sahai proof systems, is a hectic subject of research in cryptography, especially for pairing-based cryptography schemes. For these schemes, the plaintexts, ciphertexts and signatures must all live in a same group $\mathbb{G}$ in a configuration ($\mathbb{G}$; ($\mathbb{G}_T$) of pairing-friendly groups. The article "*Optimal Structure-Preserving Signatures in Asymmetric Bilinear Groups*." by Abe et al., published in the proceedings of the conference Crypto 2011, as well as the articles "*Structure-Preserving Signatures and Commitments to Group Elements.*", by Abe et al. published at Crypto 2010 and "*Structure Preserving CCA Secure Encryption and Applications*." by Camenisch et al., published in the proceedings of the conference Asiacrypt 2011, provide some insights of the discussed topic. To sum up, the following formal definition can be set up: a pairing-based cryptography scheme is said structure-preserving if the plaintext and all ciphertext components belong to a group $\mathbb{G}$ over which a bilinear map e: $\mathbb{G} \times \mathbb{G} \rightarrow \mathbb{G}_T$ is efficiently computable (with $\mathbb{G}_T$ is the target group). However, a lot of schemes cannot be easily modified in order to obtain such a feature in plaintexts, ciphertexts and signatures. More particularly, so far, all known pairing-based Identity Based Encryption (IBE) schemes, and their generalizations (that also comprise, for example, attribute-based encryption schemes), are designed to encrypt messages that are transformed into elements that live in the target group $\mathbb{G}_T$ (as main operation consist in multiplying the message by the result of a pairing operation that lies into ($\mathbb{G}_T$) or that consist of a bit string. None of available IBE schemes makes it possible to encrypt elements of $\mathbb{G}$ while preserving the ability of efficiently proving that some committed message M$\in \mathbb{G}$ is the plaintext. But, as IBE schemes, which allow one to encrypt messages using the identity of the receiver (e.g., his email address or his phone number) as a public key, are more and more used as substitute to cryptography based on certificates, it is important to provide an IBE scheme that has such a structure preserving property.

The problem is to construct an IBE where the message space is the group $\mathbb{G}$, where the arguments of the bilinear map are chosen, instead of the target group $\mathbb{G}_T$. The scheme should also make it possible to efficiently prove (using the Groth-Sahai techniques as proposed for example in the article: "*Efficient Non-interactive Proof Systems for Bilinear Groups*" by J. Groth et al., published in the proceedings of the conference Eurocrypt 2008) that a committed group element coincides with an IBE-encrypted message.

The present disclosure aims to provide a fully collusion-resistant IBE scheme which is structure-preserving. This makes it possible to efficiently prove properties about encrypted messages using the non-interactive proof systems of Groth and Sahai. By "fully collusion-resistant", we mean that the adversary is allowed to corrupt an a priori unbounded number of identities before attacking another identity. So far, such structure-preserving IBE schemes only resist a bounded number of corrupted users and the size of public parameters depends on the pre-determined bound.

At last, the present disclosure can be used as a primitive in order to construct a group signature scheme with message-dependent opening, as Sakai et al. showed in the article "*Group Signatures with Message Dependent Opening*", published in the proceedings of the 5th International Conference on Pairing-Based Cryptography (Pairing 2012), that such an IBE was necessary to obtain it. Indeed, for lack of a satisfactory solution, the authors of this mentioned article used the q-resilient IBE system of Heng and Kurosawa detailed in the article "*k-Resilient Identity-Based Encryption in the Standard Model*." by Heng et al., and published in CT-RSA'04, which is only secure against adversaries that are allowed at most q private key queries (and has public parameters of size O(q)). Hence, the present disclosure is a basic brick for providing the first efficient instantiation of a fully anonymous group signature with message-dependent opening. Indeed, the only available efficient construction is restricted to provide a weaker level of anonymity where the adversary is allowed an a priori bounded number of queries. As a consequence, if the adversary is allowed q queries, the group public key has size at least O(q). If we had a fully collusion-resistant Groth-Sahai-friendly IBE, we would avoid this overhead.

BRIEF SUMMARY OF THE DISCLOSURE

The present disclosure is directed to method for ciphering a plaintext M belonging to a group $\mathbb{G}$ of prime order p, said method being performed by an electronic device. Such method is remarkable in that it comprises:
- a step of encrypting said plaintext M in function of a public vector $Z=(Z_1, \ldots, Z_l) \in \mathbb{G}^l$ of l elements of said group $\mathbb{G}$, where $l \geq 2 \log_2(p)$, and a one-time private vector K comprising l binary elements $(K[1], \ldots, K[l]) \in \{0,1\}^l$, said step delivering a first ciphertext belonging to a group $\mathbb{G}^{k_1}$ for an integer $k_1 \geq 1$;
- a step of encrypting said l binary elements delivering a second ciphertext in a group $\mathbb{G}^{k_2}$, for an integer $k_2 > 1$.

In a preferred embodiment, such method for ciphering is remarkable in that it comprises:
- a step of obtaining said public vector $Z=(Z_1, \ldots, Z_l) \in \mathbb{G}^l$ of l elements of said group $\mathbb{G}$;
- a step of obtaining said one-time private vector K comprising l binary elements $(K[1], \ldots, K[l]) \in \{0,1\}^l$.

In a preferred embodiment, such method for ciphering is remarkable in that said step of encrypting said plaintext M comprises a step of multiplying it with a value corresponding to g(K,Z) where a function g is a universal hash function compatible with a Groth-Sahai proof scheme.

In a preferred embodiment, such method for ciphering is remarkable in that $k_1=1$, and in that said function g is defined by an equation: $g(K,Z) = \prod_{i=1}^{l} Z_i^{K[i]}$.

In a preferred embodiment, such method for ciphering is remarkable in that said step of encrypting said l binary elements comprises a step of encoding each binary element K[i], with 1≤i≤l, as a set of elements from the group $\mathbb{G}$.

In a preferred embodiment, such method for ciphering is remarkable in that said step of encrypting said l binary elements comprises a step of using a pairing based cryptography scheme in which operations in a target group $\mathbb{G}_T$ are replaced by operations in said group $\mathbb{G}$.

In a preferred embodiment, such method for ciphering is remarkable in that said pairing based cryptography scheme is a Waters IBE scheme, and in that each binary element K[i] is encrypted in such way that corresponding ciphertext of a binary element K[i] has the following form:

$$(C_{i,1}, C_{i,2}, C_{i,3}, C_{i,4}) = \left(g^{s_i}, H_{\mathbb{G}}(ID)^{s_i}, g_{K[i]}^{\frac{s_i}{\omega_i}}, g_2^{\omega_i}\right),$$

where $s_i, \omega_i$ are random values from $\mathbb{Z}_p$, and $g, g_2$ are public elements of $\mathbb{G}$, randomly chosen, $(g_0, g_1) = (g^{\alpha_0}, g^{\alpha_1})$ are public elements of $\mathbb{G}$ where $\alpha_0, \alpha_1$ are random values from $\mathbb{Z}_p$, $ID \in \{0,1\}^L$ a public identity, and hash function $H\mathbb{G}: \{0,1\}^L \to \mathbb{G}$, where L is an integer.

In a preferred embodiment, it is proposed a method for deciphering a ciphertext C belonging to a group $\mathbb{G}^{k_1}$ of prime order p, for an integer $k_1 \geq 1$, said method being performed by an electronic device. Such method is remarkable in that it comprises:

a step of determining a one-time private vector comprising l binary elements $(K[1], \ldots, K[l]) \in \{0,1\}^l$ from obtained encrypted data in group $\mathbb{G}^{k_2}$, for an integer $k_2 > 1$;

a step of determining a plaintext M belonging to said group $\mathbb{G}$ in function of said ciphertext C, a public vector $(Z_1, \ldots, Z_l) \in \mathbb{G}^l$ of l elements of said group $\mathbb{G}$, where $l \geq 2 \log_2(p)$, and said one-time private vector.

In a preferred embodiment, such method for deciphering is remarkable in that it comprises a step of obtaining a public vector $Z = (Z_1, \ldots, Z_l) \in \mathbb{G}^l$ of l elements of said group $\mathbb{G}$.

In a preferred embodiment, such method for deciphering is remarkable in that said step of determining a plaintext M comprises a step of dividing said ciphertext C with a value corresponding to g(K,Z) where a function g is a universal hash function compatible with a Groth-Sahai proof scheme.

In a preferred embodiment, such method for deciphering is remarkable in that $k_1 = 1$, and in that said function g is defined by an equation: $g(K,Z) = \prod_{i=1}^{l} Z_i^{K[i]}$.

In a preferred embodiment, such method for deciphering is remarkable in that said step of determining said l binary elements comprises a step of obtaining l encrypted data, each encrypted data having the following form:

$$(C_{i,1}, C_{i,2}, C_{i,3}, C_{i,4}) = \left(g^{s_i}, H_{\mathbb{G}}(ID)^{s_i}, g_{K[i]}^{\frac{s_i}{\omega_i}}, g_2^{\omega_i}\right),$$

where $s_i, \omega_i$ are random values from $\mathbb{Z}_p$, and $g, g_2$ are randomly chosen public elements of $\mathbb{G}$, and elements $(g_0, g_1) = (g^{\alpha_0}, g^{\alpha_1})$ are public elements of $\mathbb{G}$ where $\alpha_0, \alpha_1$ are random values from $\mathbb{Z}_p$, $ID \in \{0,1\}^L$ a public identity, and hash function $H\mathbb{G}: \{0,1\}^L \to \mathbb{G}$, where L is an integer.

In a preferred embodiment, such method for deciphering is remarkable in that said step of determining said l binary elements comprises:

a step of obtaining a private key $d_{ID} = (d_{0,1}, d_{0,2}, d_{1,1}, d_{1,2}) = (g_2^{\alpha_0} \cdot H\mathbb{G}(ID)^{r_0}, g^{r_0}, g_2^{\alpha_1} \# H\mathbb{G}(ID)^{r_1}, g^{r_1})$ where $r_0, r_1$ are random values from $\mathbb{Z}_p$; and a step of decrypting performed on each l encrypted data that comprises a step of determining $\mu_b = e(C_{i,1}, d_{b,1})/e(C_{i,2}, d_{b,2})$ for each $b \in \{0,1\}$, and if $\mu_b = e(C_{i,3}, C_{i,4})$ for some $b \in \{0,1\}$, the binary element K[i] is set to value of b.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc.

Let's also remark that a step of obtaining an element/value in the present document can be viewed either as a step of reading such element/value in a memory unit of an electronic device or a step of receiving such element/value from another electronic device via communication means.

In another embodiment, it is proposed an electronic device for ciphering a plaintext M belonging to a group $\mathbb{G}$ of prime order p, said electronic device being remarkable in that it comprises:
- means for encrypting said plaintext M in function of a public vector $(Z_1, \ldots, Z_l) \in \mathbb{G}^l$ of l elements of said group $\mathbb{G}$, where $l \geq 2 \log_2(p)$, and a one-time private vector K comprising l binary elements $(K[1], \ldots, K[l]) \in \{0,1\}^l$, said means delivering a first ciphertext belonging to a group $\mathbb{G}^{k_1}$ for an integer $k_1 \geq 1$;
- means for encrypting said l binary elements delivering a second ciphertext in a group $\mathbb{G}^{k_2}$, for an integer $k_2 > 1$.

In another embodiment, it is proposed an electronic device for ciphering a plaintext M belonging to a group $\mathbb{G}$ of prime order p, said electronic device being remarkable in that it comprises:
- first encrypting module configured to encrypt said plaintext M in function of a public vector $Z=(Z_1, \ldots, Z_l) \in \mathbb{G}^l$ of l elements of said group $\mathbb{G}$, where $l \geq 2 \log_2(p)$, and a one-time private vector K comprising l binary elements $(K[1], \ldots, K[l]) \in \{0,1\}^l$, said first encrypting module delivering a first ciphertext belonging to a group $\mathbb{G}^{k_1}$ for an integer $k_1 \geq 1$;
- second encrypting module configured to encrypt said l binary elements delivering a second ciphertext in a group $\mathbb{G}^{k_2}$, for an integer $k_2 > 1$.

In another embodiment, it is proposed an electronic device for deciphering a ciphertext C belonging to a group $\mathbb{G}^{k_1}$ of prime order p, for an integer $k_1 \geq 1$. Such electronic device is remarkable in that it comprises:
- means for determining a one-time private vector comprising l binary elements $(K[1], \ldots, K[l]) \in \{0,1\}^l$ from obtained encrypted data in group $\mathbb{G}^{k_2}$, for an integer $k_2 > 1$;
- means for determining a plaintext M belonging to said group $\mathbb{G}$ in function of said ciphertext C, a public vector $Z=(Z_1, \ldots, Z_l) \in \mathbb{G}^l$ of l elements of said group $\mathbb{G}$, where $l \geq 2 \log_2(p)$, and said one-time private vector.

In another embodiment, it is proposed an electronic device for deciphering a ciphertext C belonging to a group $\mathbb{G}^{k_1}$ of prime order p, for an integer $k_1 \geq 1$. Such electronic device is remarkable in that it comprises:
- first determining module configured to determine a one-time private vector comprising l binary elements $(K[1], \ldots, K[l]) \in \{0,1\}^l$ from obtained encrypted data in group $\mathbb{G}^{k_2}$, for an integer $k_2 > 1$;
- second determining module configured to determine a plaintext M belonging to said group $\mathbb{G}$ in function of said ciphertext C, a public vector $Z=(Z_1, \ldots, Z_l) \in \mathbb{G}^l$ of l elements of said group $\mathbb{G}$, where $l \geq 2 \log_2(p)$, and said one-time private vector.

BRIEF DESCRIPTION OF THE DRAWINGS

The above and other aspects of the disclosure will become more apparent by the following detailed description of exemplary embodiments thereof with reference to the attached drawings in which.

DETAILED DESCRIPTION OF THE DISCLOSURE

Figure 1A:
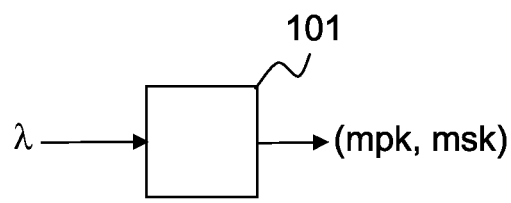
FIGS. 1(a)-(d) are reminders of the main functions (or algorithms) that define the building blocks of an identity based encryption (IBE) scheme.
Figure 1B:
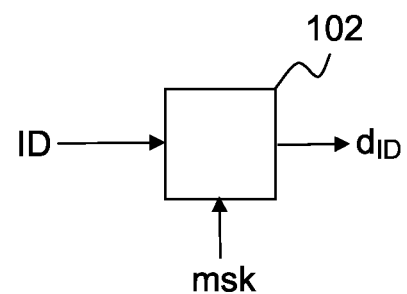
Figure 1C:
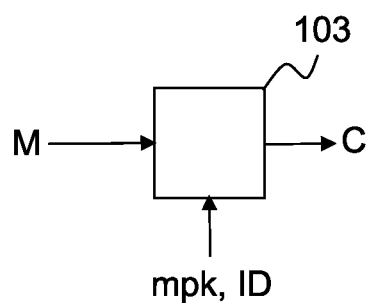
Figure 1D:
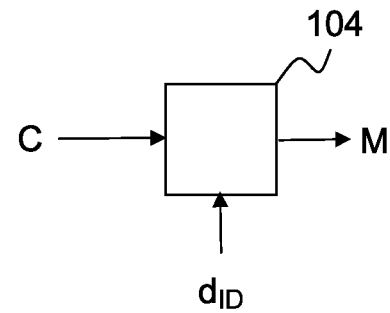

FIGS. 1(a)-(d) are reminders of the main functions (or algorithms) that define the building blocks of an identity based encryption scheme.

More precisely, an identity based encryption (IBE) scheme is defined by a 4-uplet of algorithms (Setup, Keygen, Encrypt, Decrypt), that are probabilistic polynomial-time algorithms (PPT). The function Setup, referenced 101, takes as input a security parameter $\lambda \in \mathbb{N}$ and outputs a master public key mpk and a matching master secret key msk. The function KeyGen, referenced 102, takes as input an identity ID and a master secret key msk. It outputs a private key $d_{ID}$ for the identity ID. The function Encrypt, referenced 103, takes as input an identity ID, a message M, and the master public key mpk. It outputs a ciphertext C. The function Decrypt, referenced 104, takes as input the master public key mpk, the private key $d_{ID}$ and a ciphertext C. It outputs the message M.

Correctness requires that, for any $\lambda \in \mathbb{N}$, any outputs (mpk, msk) of Setup($\lambda$), any plaintext M and any identity ID, whenever $d_{ID} \leftarrow$ KeyGen(msk, ID), we have $$\text{Decrypt}(mpk, d_{ID}, \text{Encrypt}(mpk, ID, M)) = M$$

As for other cryptosystems, notion of semantic security for IBE schemes were developed in order to determine the security level of an IBE scheme. Such semantic security enables to quantify the advantage that an attacker can obtain from a security game, as the one described in the following. For example, an IBE is said to be IND-ID-CPA secure if no PPT polynomial adversary A has a non-negligible advantage in this game:

1. The challenger generates a master key pair (mpk, msk)←Setup($\lambda$) and gives mpk to the adversary A.
2. Then, the adversary A issues a number of key extraction queries for the ID of its choice. The challenger responds with $d_{ID} \leftarrow$ KeyGen(msk, ID). Hence, the adversary collects a quantity of decryption keys, each one being associated to a different ID. In this game, the adversary doesn't know the value of the master secret key used to generate these keys.
3. When the adversary A decides that phase 2 is over, it chooses distinct equal length messages $M_0, M_1$, and an identity ID* that have never been queried to the key extraction oracle at step 2. The challenger flips a coin $$d \xleftarrow{R} \{0, 1\}$$

and return a challenge ciphertext C*=Encrypt(mpk, ID*, $M_d$).

4. The adversary A issues new queries but cannot ask for the private key of ID*.
5. The adversary A outputs a bit d'∈{0,1} and wins if d'=d. The advantage of the adversary A is defined as the distance $$Adv^{ind-id-cpa}(A) = \left| Pr(d' = d) - \frac{1}{2} \right|.$$

The security of an IBE scheme relies on several well-known algorithmic assumptions that are supposed to be hard to be solved. Indeed, generally a proof of security relates the security of a scheme to the difficulty of solving some kind of underlying mathematical problem which is believed to be difficult to solve. Hence, the security of an IBE scheme depends on how difficult we believe the underlying problem is. The following section provides some reminders on that topic, and presents some definitions that will be used for description embodiments of the invention:

Algorithmic Assumptions

We consider bilinear group ($\mathbb{G}$, ($\mathbb{G}_T$) of prime order p>$2^\lambda$, where λ is the security parameter, over which the discrete logarithm problem is presumably hard. Moreover, we assume an efficiently computable bilinear map (a.k.a "pairing") e: $\mathbb{G} \times \mathbb{G} \to \mathbb{G}_T$. Namely, it must hold that for any g,h∈ $\mathbb{G}$ and any a,b∈$\mathbb{Z}_p$, $e(g^a, h^b) = e(g,h)^{ab}$. Moreover, $e(g,h) \neq 1_{\mathbb{G}_T}$ if and only if g≠$1_\mathbb{G}$ and h≠$1_\mathbb{G}$.

In these groups, we rely on the following hardness assumptions.

In a group $\mathbb{G}$, the computational Diffie Hellman Problem (CDHP) is, given (g, $g^a$, $g^b$)∈ $\mathbb{G}^3$, to compute $g^{ab}$∈ $\mathbb{G}$.

The Decision Linear Problem (DLIN) in $\mathbb{G}$, is to distinguish the distributions $(g^a, g^b, g^{ac}, g^{bd}, g^{c+d})$∈ $\mathbb{G}^5$ and $(g^a, g^b, g^{ac}, g^{bd}, g^z)$∈ $\mathbb{G}^5$, with a, b, c, $$d \xleftarrow{R} \mathbb{Z}_p^*$$

and $$z \xleftarrow{R} \mathbb{Z}_p^*.$$

The Decision Bilinear Diffie Hellman Problem (DBDH) in ($\mathbb{G}$, $\mathbb{G}_T$), is to distinguish the distributions $(g, g^a, g^b, g^c, e(g,g)^{abc})$∈ $\mathbb{G}^4 \times \mathbb{G}_T$ and $(g, g^a, g^b, g^c, e(g,g)^z)$∈ $\mathbb{G}^4 \times \mathbb{G}_T$, with a, b, $$c \xleftarrow{R} \mathbb{Z}_p^*$$

and $$z \xleftarrow{R} \mathbb{Z}_p^*.$$

The Decision 3-party Diffie Hellman Problem (D3DH) in $\mathbb{G}$, is to distinguish the distributions $(g, g^a, g^b, g^c, g^{abc})$∈ $\mathbb{G}^5$ and $(g, g^a, g^b, g^c, g^z)$∈ $\mathbb{G}^5$, with a, b, $$c \xleftarrow{R} \mathbb{Z}_p^*$$

and $$z \xleftarrow{R} \mathbb{Z}_p^*.$$

In the following, we focus on the Waters IBE (deeply detailed in the article "*Efficient Identity-Based Encryption Without Random Oracles.*" by Waters, published in the proceedings of the conference Eurocrypt 05) and describes it, as a reminder, as an example of an IBE scheme in which a ciphertext has a component which belongs to a target group $\mathbb{G}_T$ (i.e. such scheme does not have the structure preserving property). The Waters IBE scheme is known to be IND-ID-CPA secure assuming that the DBDH problem is hard. Let's remark that obviously other IBE schemes have such property of no-structure preserving, such as the Boneh-Boyen IBE, and all other IBE scheme having an operation comprising a multiplication of the message to be encrypted with an element of the target group $\mathbb{G}_T$ defined in function of an element of the form e(.,.), with e, a pairing map.

The Waters IBE

As the Waters IBE is an IBE scheme, it can be defined, as reminded in the description of the FIG. 1, by a 4-uplet of functions that can be defined as follows:

Setup(λ):

Choose bilinear groups ($\mathbb{G}$, $\mathbb{G}_T$) of prime order p>$2^\lambda$, Then, do the following.

1. Choose $$\alpha \xleftarrow{R} \mathbb{Z}_p, g \xleftarrow{R} \mathbb{G}, g_2 \xleftarrow{R} \mathbb{G}$$

and set $g_1 = g^\alpha \in \mathbb{G}$ (the notation $$X \xleftarrow{R} Y$$

means that the element X is chosen randomly in the set Y);

2. Choose $$u_0, \ldots, u_L \xleftarrow{R} \mathbb{G},$$

for some L∈poly(λ). These will be used to implement a number theoretic hash function H $\mathbb{G}$: $\{0,1\}^L \to \mathbb{G}$ such that any L-bit string $\tau = (\tau_1, \ldots, \tau_L) \in \{0,1\}^L$ is mapped to the value H $\mathbb{G}(\tau) = u_0 \prod_{i=1}^L u_i^{\tau_i}$.

The master public key is defined as mpk=(($\mathbb{G}$, $\mathbb{G}_T$),p,g, $g_1 = g^\alpha, g_2, (u_0, \ldots, u_L)$) and the master secret key is msk=$g_2^\alpha$.

Keygen(msk, ID): given the master secret key msk=$g_2^\alpha$ and public identity ID∈$\{0,1\}^L$, compute and return $d_{ID}$=($d_1, d_2$)= ($g_2^\alpha \cdot H \mathbb{G}(ID)^r, g^r$), with $$r \xleftarrow{R} \mathbb{Z}_p.$$

Encrypt(mpk, ID, M): to encrypt a message $M \in \mathbb{G}_T$, conduct the following steps.
1. Choose $$s \xleftarrow{R} \mathbb{Z}_p;$$

2. Compute $(C_0, C_1, C_2) = (M \cdot e(g_1, g_2)^s, g^s, H\mathbb{G}(ID)^s)$
3. Then, return the ciphertext $C = (C_0, C_1, C_2) \in \mathbb{G}_T \times \mathbb{G}^2$ Hence, the message M and the ciphertext C do not have all their components in the same mathematical structure (i.e. the group $\mathbb{G}$).

Decrypt(mpk, $d_{ID}$, C):
Parse the ciphextext C as $C = (C_0, C_1, C_2)$. Compute and return $M = C_0 \cdot e(C_2, d_2)/e(C_1, d_1)$.

As already mentioned previously, the present disclosure provides a way to convert an IBE scheme with a no-preserving structure property, into an IBE scheme with a preserving structure property. In the following, one embodiment of the invention corresponds to a modified Waters IBE scheme which has the sought-after preserving structure property. However, other IBE schemes can be modified in order to have such preserving structure property.

Obtaining an IBE scheme with such preserving structure property enables to apply the Groth Sahai proof techniques (detailed in the article "*Efficient non-interactive proof systems for bilinear groups*" by Groth et al., and published in the proceedings of the conference Eurocrypt 08), in order to provide some verifiable proofs.

As a reminder, we expose in the next section the concept of Groth Sahai proof:

Groth Sahai Proof Systems

Groth and Sahai described, in the previous mentioned article, efficient non-interactive proof systems allowing a prover to convince a verifier that committed group elements satisfy certain algebraic relations. These non-interactive proofs are said witness indistinguishable (WI) because, if several sets of committed variables (called witnesses) satisfy the proved relation, the proof does not reveal any information about which specific witnesses were used by the prover. The Groth-Sahai non-interactive witness indistinguishable (NIWI) proof systems can be based on the DLIN assumption.

In this case, they use prime order groups and a common reference string consisting of three vectors $\vec{f}_1, \vec{f}_2, \vec{f}_3 \in \mathbb{G}^3$, where $\vec{f}_1 = (f_1, 1, g), \vec{f}_2 = (1, f_2, g)$ for some $f_1, f_2, g \in \mathbb{G}$.

To commit to a group element $X \in \mathbb{G}$, the prover chooses r,s $$t \xleftarrow{R} \mathbb{Z}_p^*$$

and computes $$\vec{C}_x = (1, 1, X) \cdot \vec{f}_1^r \cdot \vec{f}_2^s \cdot \vec{f}_3^t$$

On a perfectly sound common reference string, we have $\vec{f}_3 = \vec{f}_1^{\xi_1} \cdot \vec{f}_2^{\xi_2}$ where $\xi_1,$ $$\xi_2 \xleftarrow{R} \mathbb{Z}_p^*.$$

Commitments $\vec{C}_X = (\vec{f}_1^{r+\xi_1 t}, \vec{f}_2^{s+\xi_2 t}, X \cdot g^{r+s+t(\xi_1+\xi_2)})$ are extractable commitments whose distribution is that of Boneh-Boyen-Shacham (BBS) ciphertexts (the BBS schemes are detailed in the article: "*Short Group Signatures*" by D. Boneh et al., and published in the proceeding of the conference Crypto 2004): committed values can be extracted using $\beta_1 = \log_g(f_1), \beta_2 = \log_g(f_2)$. In the witness indistinguishability (WI) setting, vector $\vec{f}_3$ is chosen outside the span of $(\vec{f}_1, \vec{f}_2)$, so that $\vec{C}_X$ is a perfectly hiding commitment. Under the DLIN assumption, the two kinds of CRS (for Common Reference String) are computationally indistinguishable.

To commit to an exponent $x \in \mathbb{Z}$, one computes $\vec{C}_x = \vec{\phi}^x \cdot \vec{f}_1^r \cdot \vec{f}_2^s$, with r, $$s \xleftarrow{R} \mathbb{Z}_p^*,$$

using a CRS comprising vectors $\vec{\phi}, \vec{f}_1, \vec{f}_2$. In the soundness setting $\vec{\phi}, \vec{f}_1, \vec{f}_2$ are linearly independent vectors (typically, one chooses $\vec{\phi} = \vec{f}_3 \cdot (1, 1, g)$ where $\vec{f}_3 = \vec{f}_1^{\xi_1} \cdot \vec{f}_2^{\xi_2}$) whereas, in the WI setting, choosing $\vec{\phi} = \vec{f}_1^{\xi_1} \cdot \vec{f}_2^{\xi_2}$ gives a perfect hiding commitment since $\vec{C}_x$ is always a BBS encryption of $1 \in \mathbb{G}$. On a perfectly sound CRS (where $\vec{f}_3 = \vec{f}_1^{\xi_1} \cdot \vec{f}_2^{\xi_2}$ and $\vec{\phi} = \vec{f}_3 \cdot (1, 1, g)$), commitments to exponents are not fully extractable since the trapdoor $(\alpha_1, \alpha_2)$ only allows recovering $g^x$ from $\vec{C}_x = \vec{\phi}^x \cdot \vec{f}_1^r \cdot \vec{f}_2^s$.

To provide evidence that committed group elements satisfy a set of relations, the prover computes one commitment per variable and one proof element per relation. Such efficient NIWI proofs are available for pairing-product equations, which are relations of the type:

$$\Pi_{i=1}^n e(\aleph_i, L_i) \Pi_{i=1}^n \Pi_{j=1}^n e(L_i, L_j)^{\alpha_{ij}} = t_T \quad (1)$$

For variables $L_1, \ldots, L_n \in \mathbb{G}$, and constants $t_T \in \mathbb{G}_T$, $\aleph_1, \ldots, \aleph_n \in \mathbb{G}$, $\alpha_{ij} \in \mathbb{Z}_p$, for $i, j \in \{1, \ldots, n\}$.

In pairing product equations, proof for quadratic equations require 9 group elements whereas linear equations (i.e., whereas $\alpha_{ij} = 0$ for all i,j in equation (1) only cost 3 group element each.

Efficient NIWI proofs also exist for multi exponentiation equations which are equation of the form:

$$\Pi_{i=1}^m \aleph_i^{y_i} \cdot \Pi_{j=1}^n L_j^{b_j} \Pi_{i=1}^m \cdot \Pi_{j=1}^n L_j^{y_i \gamma_{ij}} = T$$

For variables $L_1, \ldots, L_n \in \mathbb{G}, y_1, \ldots, y_m \in \mathbb{Z}_p$ and constants $\aleph_1, \ldots, \aleph_m \in \mathbb{G}, b_1, \ldots, b_m \in \mathbb{Z}_p$, and $\gamma_{ij} \in \mathbb{G}$ for $i \in \{1, \ldots, m\}, j \in \{1, \ldots, n\}$.

Multi-exponentiation equations admit non interactive zero knowledge proof (NIZK) proofs.

For linear equations (i.e. when $\gamma_{ij} = 0$ for all i,j), the size of proofs depends on the form of the considered equation. Namely, linear multi-exponentiation equations of the type $\Pi_{j=1}^n L_j^{b_j} = T$ (resp. $\Pi_{i=1}^m \aleph_i^{y_i} = T$) demand 3 (resp. 2) group elements.

Figure 2:
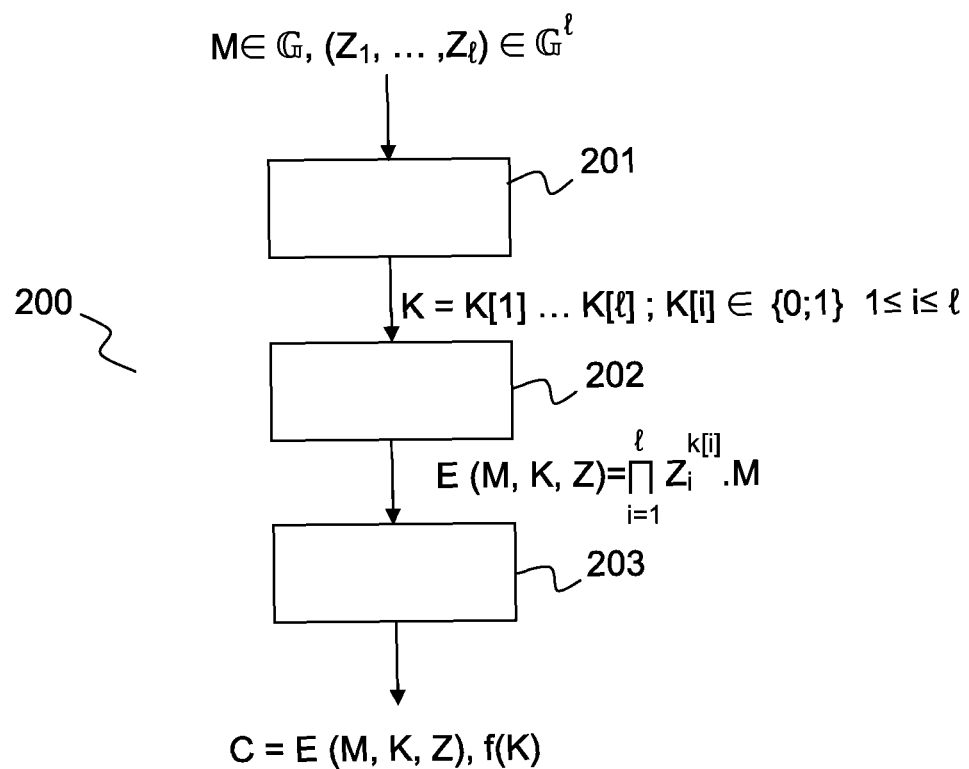
FIG. 2 presents a flowchart with the main steps that can be used in a modified IBE scheme (or more generally to a pairing-based cryptography scheme) in order to fulfill with the structure preserving criteria when performing for example a ciphering of a message.

FIG. 2 presents a flowchart with the main steps that can be used in a modified IBE scheme (or more generally to a pairing-based cryptography scheme) in order to meet the structure preserving requirement when performing a ciphering of a message.

The scheme builds on the fact (which is implied by Lemma 5.1 in the article: "*Trapdoors for hard lattices and new cryptographic constructions.*" by Gentry et al., published in the proceedings of the conference STOC'08) that, when $l > 2 \log_2(p)$, if $\alpha_1, \ldots, \alpha_l \in_R \mathbb{Z}_p$ are uniformly chosen in $\mathbb{Z}_p$, with overwhelming probability, any $x \in \mathbb{Z}_p$ can be written $x = \sum_{i=1}^{l} \beta_i \alpha_i$ for some $(\beta_1, \ldots, \beta_l) \in \{0,1\}^l$. The idea is to include a vector $(Z_1, \ldots, Z_l) \in \mathbb{G}^l$ in the master public key.

Indeed, in such embodiment of the invention, in an IBE scheme, when a message $M \in \mathbb{G}$ have to be encrypted, an l-uplet of elements belonging to the group $\mathbb{G}$ is used as part of the public key. Such l-uplet can be viewed as a vector defined as follows: $Z = (Z_1, \ldots, Z_l) \in \mathbb{G}^l$, where the elements $Z_i$ were generated randomly in $\mathbb{G}$. Then, in a step referenced 201, a random l-bit string $K = (K[1], \ldots, K[l]) \in \{0,1\}^l$ (that can be viewed as a one-time secret key) is generated by the electronic device on which the method is executed. Such bit string K must be re-generated each time the ciphering method is executed. Then, in a step referenced 202, the message $M \in \mathbb{G}$ is ciphered as follows: $E(M,K,Z) = \Pi_{i=1}^{l} Z_i^{K[i]} \cdot M$. So, the message $M \in \mathbb{G}$ will be encrypted by using a random l-bit string $K = (K[1], \ldots, K[l]) \in \{0,1\}^l$ and multiplying M with a product of elements in the set $\{Z_i/K[i]=1\}$. As the random l-bit string K is needed to perform the decryption process, such string K is then encrypted in a step referenced 203. In one embodiment, such encrypted result $f(K)$ also belongs to a Cartesian product of the group $\mathbb{G}$. Indeed, in one embodiment, each bit $K[i]$ of K will be individually encrypted using a variant of the Waters IBE or another variant of a pairing cryptography encryption scheme (in another embodiments, groups of bit $K[i]$ can be encrypted using another variant of the Waters IBE, or another variant of a pairing cryptography encryption scheme). In the latter variant, an encryption of the bit value 1 will consist of a tuple $(C_{i,1}, C_{i,2}, C_{i,3}, C_{i,4}) = (g^{s_i}, H_{\mathbb{G}}(ID)^{s_i}, g_1^{s_i/\omega_i}, g_2^{\omega_i})$, where $s_1, \omega_i \in_R \mathbb{Z}_p$. In an encryption of the bit value 0, the tuple $(C_{i,1}, C_{i,2}, C_{i,3}, C_{i,4}) = (g^{s_i}, H_{\mathbb{G}}(ID)^{s_i}, C_{i,3}, C_{i,4})$, where the pair $(C_{i,3}, C_{i,4})$ is chosen uniformly in $\mathbb{G}^2$. Upon decryption, the receiver can use his private key $(d_1, d_2)$ to test whether $$e(C_{i,3}, C_{i,4}) = e(C_{i,1}, d_1)/e(C_{i,2}, d_2)$$

If this equality holds, the receiver decodes the i-th bit of K as $K[i]_i = 1$. Otherwise, if such equality doesn't hold, it means that $K[i] = 0$. The security of the resulting scheme can be proved under the D3DH assumption (instead of the DBDH assumption).

To sum up, the present disclosure aims to replace in a pairing based cryptography scheme, the operation "$M \cdot e(.,.)$" (which consists of multiplying a message from the target group with the result of a pairing function raised to a power) by the following operation $(M,K,Z) = \Pi_{i=1}^{l} Z_i^{K[i]} \cdot M$, where in this case the message belongs to the group $\mathbb{G}$ and the mask $\Pi_{i=1}^{l} Z_i^{K[i]}$ can be seen as a universal hash function of a one-time key K. Moreover, as such substitute operation uses a one-time key K that must be also transmitted, the present disclosure proposes to encrypt each bits of the key K in such way that the encrypted value of K belongs to the same group $\mathbb{G}$. In order to do that, a modified IBE scheme can be used. The modification aims to also replace the use of the pairing function on the encryption side by operations performed only in $\mathbb{G}$. The process referenced 200 comprises the execution steps 201, 202 and 203, and can be viewed as a modified IBE scheme with structure preserving property.

Figure 3:
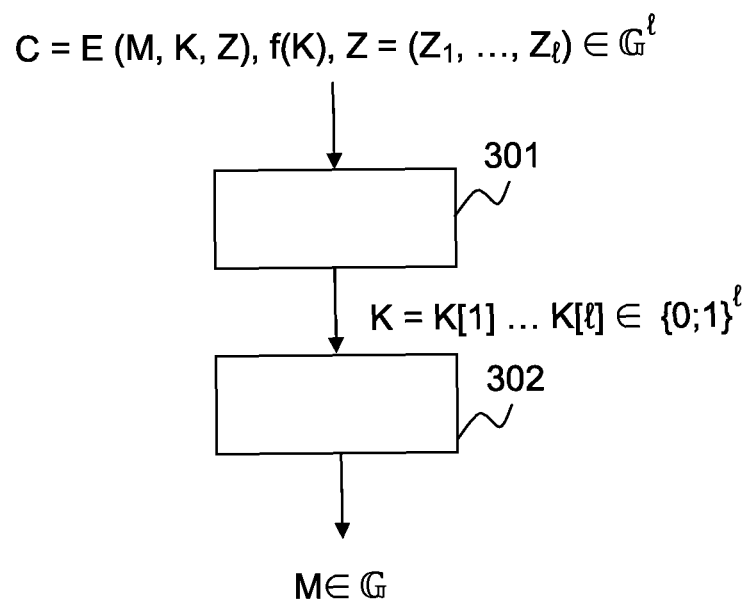
FIG. 3 presents a flowchart with the main steps that can be used in a modified IBE scheme (or more generally to a pairing-based cryptography scheme) in order to fulfill with the structure preserving criteria when performing a deciphering of a message from a ciphertext.

FIG. 3 presents a flowchart with the main steps that can be used in a modified IBE scheme (or more generally to a pairing-based cryptography scheme) in order to fulfill with the structure preserving criteria when performing a deciphering of a message from a ciphertext.

When an electronic device receives a ciphertext obtained through the execution of the method described in the FIG. 2, as well as the public vector $Z = (Z_1, \ldots, Z_l) \in \mathbb{G}^l$, in order to recover the plaintext, it performs a step referenced 301 in which it obtains the random l-bit string $K = (K[1], \ldots, K[l])$ $\in \{0,1\}^l$. Then, the electronic device is able to perform, in a step referenced 302, the inverse operation of the one performed in step 202. In one embodiment, the deciphering operation is the following one: $D(C,K,Z) = C/\Pi_{i=1}^{l} Z_i^{K[i]}$.

In another embodiment of the invention, the step 202 comprises the use of the following function: $E(M,K,Z) = M/\Pi_{i=1}^{l} Z_i^{K[i]}$, and the step 302 comprises the use of the following function: $D(C,K,Z) = C \cdot \Pi_{i=1}^{l} Z_i^{K[i]}$.

In another embodiment of the invention, the step 202 comprises the use of the following function: $E(M,K,Z) = M \cdot g(K,Z)$, and the step 302 comprises the use of the following function: $D(C,K,Z) = C/g(K,Z)$, with a function g that can be viewed as a kind of a number theoretic hash function. The value $g(K,Z)$ can be viewed as a mask value. In another embodiment, the function g can be viewed as a kind of universal hash function.

Let's remark that although the proposed technique in FIG. 2, with the encryption of individual bits of $K[i]$ of K via the variant of the Waters IBE, allows encrypting messages in the group $\mathbb{G}$, it still does not provide all the properties we need for the application suggested in the article of Sakai et al. previously mentioned. When it comes to prove that a ciphertext encrypts the same message as the one hidden in a Groth-Sahai commitment, the difficulty is to prove that, when $K[i] = 0$, the equality $$e(C_{i,3}, C_{i,4}) = e(C_{i,1}, d_1)/e(C_{i,2}, d_2)$$

is not satisfied.

Another Embodiment of the Invention

In order to be able to efficiently prove that a ciphertext and a Groth-Sahai commitment hide the same group element, another modification of the Waters IBE is proposed. In the master public key, the element $g_1$ is replaced by a pair $(g_0, g_1) = (g^{\alpha_0}, g^{\alpha_1})$. The master secret key (msk) is twinned in the same way and now consists of $(g_2^{\alpha_0}, g_2^{\alpha_1})$. Likewise, each identity is assigned a private key of the form $(d_{0,1}, d_{0,2}, d_{1,1}, d_{1,2}) = (g_2^{\alpha_0} \cdot H_{\mathbb{G}}(ID)^{r_0}, g^{r_0} g_2^{\alpha_1} \cdot H_{\mathbb{G}}(ID)^{r_1}, g^{r_1})$.

In the encryption algorithm, when the sender wants to "encrypt" a bit $K[i]$ of $K \in \{0,1\}^l$, it generates $$(C_{i,3}, C_{i,4}) \text{ as } (C_{i,3}, C_{i,4}) = \left( g_{K[i]}^{\frac{s_i}{\omega_i}}, g_2^{\omega_i} \right),$$

so that the receiver can easily determine the value of $K[i]$ using his private key. The modification will make it easier to prove equalities between the plaintext and a committed value. The reason is that the prover does not have to prove an inequality when $K[i] = 0$. He essentially has to prove that $$(C_{i,3}, C_{i,4}) = \left( g_0^{\frac{s_i}{\omega_i}}, g_2^{\omega_i} \right) \text{ or}$$

$$(C_{i,3}, C_{i,4}) = \left( g_1^{\frac{s_i}{\omega_i}}, g_2^{\omega_i} \right).$$

The 4-uplet of algorithms that define the identity based encryption according to one embodiment of the invention are the following ones:

Setup($\lambda$):
Choose bilinear groups ($\mathbb{G}$, $\mathbb{G}_T$) of prime order p>$2^\lambda$, Then, do the following.
1. Choose $\alpha_0$, $$\alpha_1 \xleftarrow{R} \mathbb{Z}_p, g \xleftarrow{R} \mathbb{G}, g_2 \xleftarrow{R} \mathbb{G}_1$$

and set $g_0=g^{\alpha_0} \in \mathbb{G}$, $g_1=g^{\alpha_1} \in \mathbb{G}$.
2. Choose $$u_0, \ldots, u_L \xleftarrow{R} \mathbb{G},$$

for some L$\in$poly($\lambda$). These will be used to implement a number theoretic hash function H$\mathbb{G}$: $\{0,1\}^L \to \mathbb{G}$ such that any L-bit string $\tau=(\tau_1, \ldots, \tau_L) \in \{0,1\}^L$ is mapped to the value H$\mathbb{G}(\tau)=u_0\Pi_{i=1}^L u_i^{\tau_i}$.
3. Choose group elements $$(Z_1, \ldots, Z_l) \xleftarrow{R} \mathbb{G}^l$$

where l=2 $\log_2(p)$>$\lambda$
The master public key is defined as mpk=(($\mathbb{G}$, $\mathbb{G}_T$),p,g, $g_0=g^{\alpha_0}$,$g_1=g^{\alpha_1}$,$g_2$,($u_0, \ldots, u_L$), ($Z_1, \ldots, Z_l$)) and the master secret key is msk:=($g_2^{\alpha_0}$,$g_2^{\alpha_1}$).
Keygen(msk,ID): given the master secret key msk:=($g_2^{\alpha_0}$, $g_2^{\alpha_1}$) and an identity ID$\in\{0,1\}^L$, compute and return $d_{ID}$= $(d_{0,1},d_{0,2},d_{1,1},d_{1,2})=(g_2^{\alpha_0} \cdot H\mathbb{G}(ID)^{r_0},g^{r_0},g_2^{\alpha_1} \cdot H\mathbb{G}(ID)^{r_1},g^{r_1})$
where $r_0$, $$r_1 \xleftarrow{R} \mathbb{Z}_p.$$

Encrypt(mpk, ID, M): to encrypt a message M$\in \mathbb{G}$, conduct the following steps.
1. Choose a random K=K[1], $\ldots$, K[l]$\in\{0,1\}^l$, where l=2 $\log_2(p)$.
2. Choose a random S=($s_1, \ldots, s_l$)$\in\{\mathbb{Z}_p\}^l$, and a random $\Omega=(\omega_1, \ldots, \omega_l)\in\{\mathbb{Z}_p\}^l$.
3. For I=1 to l, compute $$(C_{i,1}, C_{i,2}, C_{i,3}, C_{i,4}) = \left(g^{s_i}, H_\mathbb{G}(ID)^{s_i}, g_{K[i]}^{\frac{s_i}{\omega_i}}, g_2^{\omega_i}\right)$$

4. Then, compute $C_0=M \cdot \Pi_{i=1}^l Z_i^{K[i]}$.
Then, return the ciphertext C=($C_0,\{C_{i,1},C_{i,2},C_{i,3},C_{i,4}\}_{i=1}^l$)$\in \mathbb{G}^{4l+1}$
Decrypt(mpk,$d_{ID}$,C):
Parse the ciphertext C as C=($C_0,\{C_{i,1},C_{i,2},C_{i,3},C_{i,4}\}_{i=1}^l$)$\in \mathbb{G}^{4l+1}$
1. For i=1 to l compute $\mu_b=e(C_{i,1},d_{b,1})/e(C_{i,2},d_{b,2})$ for each b$\in\{0,1\}$
If $\mu_b=e(C_{i,3},C_{i,4})$ for some b$\in\{0,1\}$, set K[i]=b. Otherwise, return $\perp$.
2. Compute and return $M=C_0/\Pi_{i=1}^l Z_i^{K[i]}$.

As already mentioned previously, in another embodiment of the invention, the encryption of the bits of K is not performed bit per bit, but is performed by group of bits.

Figure 4:
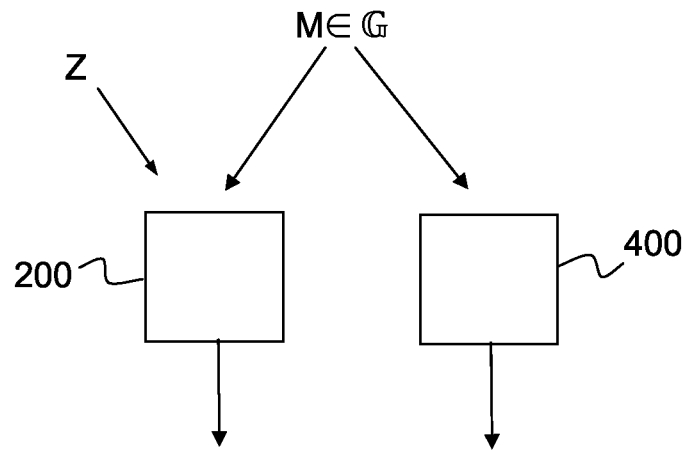
FIG. 4 presents a way to use a modified IBE scheme as disclosed in FIG. 2, in connection with a commitment scheme applied on a same input message.

FIG. 4 presents a way to use a modified IBE scheme as disclosed in FIG. 2, in connection with a commitment scheme applied on a same input message.

Unlike the IBE system described in the article of Sakai et al. previously mentioned, the previous described embodiment of the invention provides a full collusion-resistance and the size of the master public key only depends on the security parameter (and not on a pre-determined upper bound on the number of corrupted users). At the same time, the proposed solution retains the useful property of the scheme described in the article of Sakai et al. previously mentioned, as it allows efficiently proving relations about the plaintext using the Groth-Sahai techniques. To this end, the sender has to proceed as described hereunder.

Indeed, for a message M$\in \mathbb{G}$, that is encrypted with the method 200, and for which a commitment is also performed in a step referenced 400 (corresponding to the execution of a Groth Sahai commitment scheme), it is possible to prove that it is the same value that is used. If $\vec{C}_M=(1,1,M)\cdot \vec{f}_1^{r_M} \cdot \vec{f}_2^{s_M} \cdot \vec{f}_3^{t_M}$ denotes a Groth-Sahai commitment to a message M$\in \mathbb{G}$ which is also encrypted with the above IBE, the sender can proceed as follows to prove the equality between the committed and the plaintext.

For each i$\in\{1, \ldots, 1\}$, the sender computes a commitment $$\vec{C}_{K_i} = (1, 1, g^{K[i]}) \cdot \vec{f}_1^{r_{K_i}} \cdot \vec{f}_2^{s_{K_i}} \cdot \vec{f}_3^{t_{K_i}}$$

to the group element $K_i=g^{K[i]}$ and generates a non-interactive proof $\vec{\pi}_{K[i]}$ that K[i]$\in\{0,1\}$. This is typically achieved by proving the equality K[i]$^2$=K[i] mod p with a proof $\vec{\pi}_{K[i]}$ consisting of 9 group elements. Next, the sender generates a commitment $\vec{C}_{G_i}$ to the group element $G_i=g_{K[i]}$ and generates a non-interactive proof $\vec{\pi}_{G_i}$ that committed elements $G_i$ and K[i] satisfy the equality $$G_i=g_1^{K[i]} \cdot g_0^{1-K[i]}$$

Or equivalently, $$e(G_i,g)=e(g_1,K_i)\cdot e(g_0 K_i^{-1},g).$$

The latter is a linear equation for which the proof $\vec{\pi}_{G_i}$ requires three group elements. Then, the sender generates a commitment $\vec{C}_{\Theta_i}$ to the auxiliary variable $\Theta_i=g^{s_i/\omega_i}$ and generate non-interactive proofs $\vec{\pi}_{\Theta_i,1}$, $\vec{\pi}_{\Theta_i,2}$ for the relations $$e(\Theta_i,C_{i,4})=e(C_{i,1},g_2)$$

$$e(\Theta_i,G_i)=e(g,C_{i,3}).$$

Since the first relationship is a linear equation $\vec{\pi}_{\Theta_i,1}$ only requires 3 group elements. On the other hand, as the second relationship is quadratic, determining $\vec{\pi}_{\Theta_i,2}$ costs 9 group elements to prove. These proofs enable a verifier to be convinced that the encrypted value of the bits of string K has the right form.

Finally, the sender is left with proving the equality $e(C_0/M,g)=\Pi_{i=1}^l e(Z_i,K_i)$, which is a linear equation whose proof $\vec{\pi}_{C_0}$ requires three group elements.

The whole NIWI proof ($\{\vec{C}_{K_i},\vec{C}_{G_i},\vec{C}_{\Theta_i},\vec{\pi}_{K[i]},\vec{\pi}_{G_i},\vec{\pi}_{\Theta_i,1},\vec{\pi}_{\Theta_i,2}\}_{i=1}^l, \vec{\pi}_{C_0}$) thus takes 35l+3 group elements.

Having proved that $\vec{C}_M$ and the IBE ciphertext hide the same value $M \in \mathbb{G}$, the sender is able to prove additional statement about M using the Groth-Sahai techniques in the usual way. In one embodiment of the invention, a group $\mathbb{G}$ corresponds to a group $E(\mathbb{F}_q)$, where E is an elliptic curve over the field $\mathbb{F}_q$ and q is a large prime number, and with #E $(\mathbb{F}_q)=q+1$ (where p divides q+1), and a target group $\mathbb{G}_T$ corresponds to the group $\mathbb{F}_{q^k}$, with k≥2.

Let's remark that, in one embodiment of the invention, the same technique can be applied to other encryption schemes where the message to be encrypted initially lives in the target group $\mathbb{G}_T$. For example, it can be applied to the hierarchical identity-based encryption (HIBE) scheme disclosed in the article "*Hierarchical Identity Based Encryption with Constant Size Ciphertext*", by D. Boneh et al., and published in the proceedings of Eurocrypt 2005, as well as to the forward-secure public-key encryption scheme implied by the latter HIBE system via the transformation described in the article "*A Forward-Secure Public-Key Encryption Scheme*" by R. Canetti et al., and published in the proceedings of Eurocrypt 2003. By combining these two techniques, we can obtain a structure-preserving forward-secure public-key encryption scheme with ciphertexts comprised of $O(\lambda)$ group elements, where $\lambda$ is the security parameter.

Figure 5:
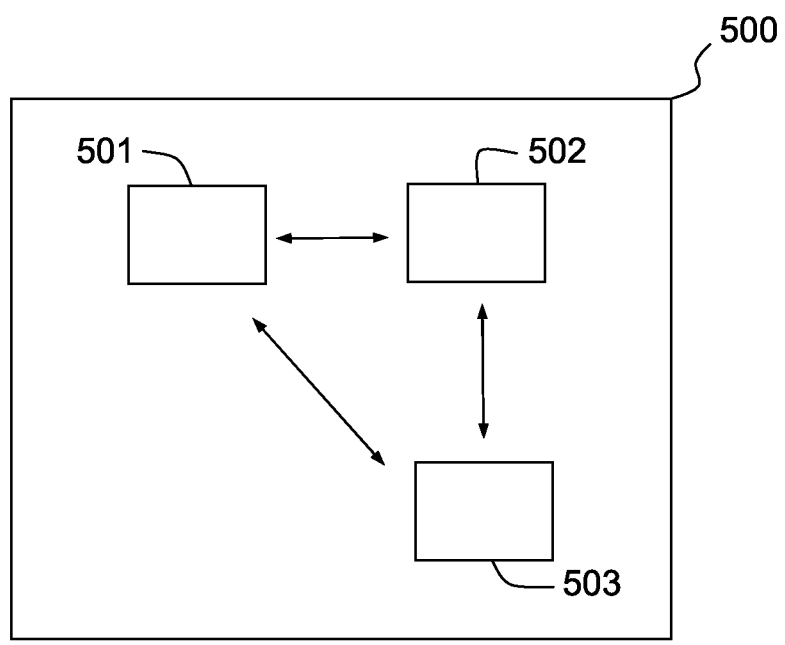
FIG. 5 presents an electronic device that can be used to perform one or several steps of the methods disclosed in the present document.

FIG. 5 presents a device that can be used to perform one or several steps of methods disclosed in the present document.

Such device referenced 500 comprise a computing unit (for example a CPU, for "Central Processing Unit"), referenced 501, and one or several memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 502. Computer programs are made of instructions that can be executed by the computing unit. Such device 500 can also comprise a dedicated unit, referenced 503, constituting an input-output interface to allow the device 500 to communicate with other devices. In particular, this dedicated unit 503 can be connected with an antenna (in order to perform communication without contacts), or with serial ports (to carry communications "contact"). Let's remark that the arrows in FIG. 5 mean that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 5.

The invention claimed is:

1. Method for ciphering a plaintext M belonging to a group $\mathbb{G}$ of prime order p, said method being performed by an electronic device, and wherein it comprises:
   encrypting said plaintext M in function of a public vector $Z=(Z_1, \ldots, Z_l) \in \mathbb{G}^l$ of l elements of said group $\mathbb{G}$, where $l \geq 2 \log_2(p)$, and a one-time private vector K comprising l binary elements $(K[1], \ldots, K[l]) \in \{0,1\}^l$, said step delivering a first ciphertext belonging to a group $\mathbb{G}^{k_1}$ for an integer $k_1 \geq 1$;
   encrypting said binary elements delivering a second ciphertext in a group $\mathbb{G}^{k_2}$, for an integer $k_2 > 1$.

2. Method according to claim 1, wherein said method comprises:
   obtaining said public vector $Z=(Z_1, \ldots, Z_l) \in \mathbb{G}^l$ of l elements of said group $\mathbb{G}$;
   obtaining said one-time private vector comprising binary elements $(K[1], \ldots, K[l]) \in \{0,1\}^l$.

3. Method according to claim 1, wherein said encrypting said plaintext M comprises multiplying it with a value corresponding to g(K,Z) where a function g is a universal hash function compatible with a Groth-Sahai proof scheme.

4. Method according to claim 3, wherein $K_1=1$ and said function g is defined by an equation: $g(K,Z)=\Pi_{i=1}^{l} Z_i^{K[i]}$.

5. Method according to claim 1, wherein said encrypting said l binary elements comprises encoding each binary element $K[i]$, with $1 < i < l$, as a set of elements from the group $\mathbb{G}$.

6. Method according to claim 1, wherein said encrypting said l binary elements comprises using a pairing based cryptography scheme in which operations in a target group $\mathbb{G}_T$ are replaced by operations in said group $\mathbb{G}$.

7. Method according to claim 6, wherein said pairing based cryptography scheme is a Waters IBE scheme, and each binary element $K[i]$ is encrypted in such way that corresponding ciphertext of a binary element $K[i]$ has the following form:

$$(C_{i,1}, C_{i,2}, C_{i,3}, C_{i,4}) = \left(g^{s_i}, H_\mathbb{G}(ID)^{s_i}, g_{K[i]}^{\frac{s_i}{\omega_i}}, g_2^{\omega_i}\right),$$

where $s_i, \omega_i$ are random values from $\mathbb{Z}_p$ and $g, g_2$ are public elements of $\mathbb{G}$, randomly chosen, $(g_0, g_1)=(g^{\alpha_0}, g^{\alpha_1})$ are public elements of $\mathbb{G}$ where $\alpha_0, \alpha_1$ are random values from $\mathbb{Z}_p$, $ID \in \{0,1\}^L$ public identity, and hash function $H_\mathbb{Z}: \{0,1\}^L \to \mathbb{G}$, where L is an integer.

8. Method for deciphering a ciphertext C belonging to a group $\mathbb{G}^{k_1}$ of prime order p, for an integer $k_1 \geq 1$, said method being performed by an electronic device, wherein it comprises:
   determining a one-time private vector comprising l binary elements $(K[1], \ldots, K[l]) \in \{0,1\}^l$ from obtained encrypted data in group $\mathbb{G}^{k_2}$, for an integer $k_2 > 1$;
   determining a plaintext M belonging to said group $\mathbb{G}$ in function of said ciphertext C, a public vector $Z=(Z_1, \ldots, Z_l) \in \mathbb{G}^l$ of l elements of said group $\mathbb{G}$, where $l \geq 2 \log_2(p)$, and said one-time private vector.

9. Method according to claim 8, wherein it comprises obtaining a public vector $Z=(Z_1, \ldots, Z_l) \in \mathbb{G}^l$ of l elements of said group $\mathbb{G}$.

10. Method according to claim 8, wherein said determining a plaintext M comprises dividing said ciphertext C with a value corresponding to g(K,Z) where a function g is a universal hash function compatible with a Groth-Sahai proof scheme.

11. Method according to claim 10, wherein $k_1=1$ and said function g is defined by an equation: $g(K,Z)=\Pi_{i=1}^{l} Z_i^{K[i]}$.

12. Method according to claim 8, wherein said determining said l binary elements comprises obtaining l encrypted data, each encrypted data having the following form:

$$(C_{i,1}, C_{i,2}, C_{i,3}, C_{i,4}) = \left(g^{s_i}, H_\mathbb{G}(ID)^{s_i}, g_{K[i]}^{\frac{s_i}{\omega_i}}, g_2^{\omega_i}\right),$$

where $s_i, \omega_i$ are random values from $\mathbb{Z}_p$, and $g, g_2$ are randomly chosen public elements of $\mathbb{G}$, and elements $(g_0, g_1)=(g^{\alpha_0}, g^{\alpha_1})$ are public elements of $\mathbb{G}$ where $\alpha_0, \alpha_1$ are random values from $\mathbb{Z}_p$, ID∈$\{0,1\}^L$ a public identity, and hash function H$\mathbb{G}$: $\{0,1\}^L \to \mathbb{G}$, where L is an integer.

13. Method according to claim 12, wherein said determining said l binary elements comprises:

obtaining a private key $d_{ID}=(d_{0,1},d_{0,2},d_{1,1},d_{1,2})=(g_2^{\alpha_0},H\mathbb{G}(ID)^{r_0},g^{r_0},g_2^{\alpha_1},H\mathbb{G}(ID)^{r_1},g^{r_2})$ where $r_0,r_1$ are random values from $\mathbb{Z}_p$; and decrypting performed on each l encrypted data that comprises determining $\mu_b=e(C_{i,1},d_{b,1})/e(C_{i,2},d_{b,2})$ for each b∈$\{0,1\}$, and if $\mu_b=(C_{i,3}, C_{i,4})$ for some b∈$\{0,1\}$, the binary element K[i] is set to value of b.

14. A computer-readable and non-transitory storage medium storing a computer program comprising a set of computer-executable instructions to implement a method for cryptographic computations when the instructions are executed by a computer, wherein the instructions comprise instructions, which when executed, configure the computer to perform a method for ciphering a plaintext M belonging to a group~of prime order p, wherein it comprises:

encrypting said plaintext M in function of a public vector Z=(Z.sub.1, ..., Z.sub.1).epsilon..sup.1 of l elements of said group, where 1.gtoreq.2 log.sub.2(p), and a one-time private vector K comprising 1 binary elements (K[1], ..., K[1]).epsilon.[0,1].sup.1, said step delivering a first ciphertext belonging to a group.sup.k.sup.1 for an integer k.sub.1.gtoreq.1; encrypting said 1 binary elements delivering a second ciphertext in a group.sup.k.sup.2, for an integer k.sub.2>1.

15. A computer-readable and non-transitory storage medium storing a computer program comprising a set of computer-executable instructions to implement a method for cryptographic computations when the instructions are executed by a computer, wherein the instructions comprise instructions, which when executed, configure the computer to perform a method for deciphering a ciphertext C belonging to a group.sup.k.sup.1 of prime order p, for an integer k.sub.1.gtoreq.1, wherein it comprises: determining a one-time private vector comprising 1 binary elements (K[1], ..., K[1]).epsilon.[0,1].sup.1 from obtained encrypted data in group.sup.k.sup.2, for an integer k.sub.2>1; determining a plaintext M belonging to said group in function of said ciphertext C, a public vector Z=(Z.sub.1, ..., Z.sub.1).epsilon..sup.1 of l elements of said group, where 1.gtoreq.2 log.sub.2(p), and said one-time private vector.

16. Electronic device for ciphering a plaintext M belonging to a group $\mathbb{G}$ of prime order p, wherein said electronic device further comprises:

first encrypting module configured to encrypt said plaintext M in function of a public vector $Z=(Z_1, \ldots, Z_l)\in \mathbb{G}^l$ of l elements of said group $\mathbb{G}$, where $l \geq 2 \log_2(p)$, and a one-time private vector K comprising l binary elements $(K[1], \ldots, K[l])\in \{0,1\}^l$, said first encrypting module delivering a first ciphertext belonging to a group $\mathbb{G}^{k_1}$ for an integer $k_1 \geq 1$;

second encrypting module configured to encrypt said l binary elements delivering a second ciphertext in a group $\mathbb{G}^{k_2}$, for an integer $k_2 > 1$.

17. Electronic device for deciphering a ciphertext C belonging to a group $\mathbb{G}^{k_1}$ of prime order p, for an integer $k_1 \geq 1$, wherein said electronic device further comprises:

first determining module configured to determine a one-time private vector comprising l binary elements $(K[1], \ldots, K[l])\in \{0,1\}^l$ from obtained encrypted data in group $\mathbb{G}^{k_2}$, for an integer $k_2 > 1$;

second determining module configured to determine a plaintext M belonging to said group $\mathbb{G}$ in function of said ciphertext C, a public vector $(Z_1, \ldots, Z_l)\in \mathbb{G}^l$ of l elements of said group $\mathbb{G}$, where $l > 2 \log_2(p)$, and said one-time private vector.

* * * * *